(12) United States Patent
Wang et al.

(10) Patent No.: US 7,228,903 B2
(45) Date of Patent: Jun. 12, 2007

(54) APPARATUS AND METHOD FOR WIRELINE IMAGING IN NONCONDUCTIVE MUDS

(75) Inventors: Tsili Wang, Katy, TX (US); Alexandre Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 209 days.

(21) Appl. No.: 10/951,755

(22) Filed: Sep. 28, 2004

(65) Prior Publication Data

US 2005/0068036 A1    Mar. 31, 2005

Related U.S. Application Data

(63) Continuation-in-part of application No. 10/616,857, filed on Jul. 8, 2003, now Pat. No. 6,957,708.

(51) Int. Cl.
*E21B 47/12* (2006.01)
*G01V 3/08* (2006.01)

(52) U.S. Cl. ............... 166/254.2; 166/66.5; 166/248; 324/338

(58) Field of Classification Search ............... None
See application file for complete search history.

(56) References Cited

U.S. PATENT DOCUMENTS

| | | | |
|---|---|---|---|
| 2,930,969 A | 3/1960 | Baker | 324/10 |
| 3,973,181 A | 8/1976 | Calvert | 324/5 |
| 4,052,662 A | 10/1977 | Rau | 324/6 |
| 4,122,387 A | 10/1978 | Ajam et al. | 324/10 |
| 4,468,623 A | 8/1984 | Gianzero et al. | 324/367 |
| 4,780,678 A * | 10/1988 | Kleinberg et al. | 324/338 |
| 5,200,705 A | 4/1993 | Clark et al. | 324/338 |
| 5,339,036 A | 8/1994 | Gianzero et al. | 324/338 |
| 5,502,686 A | 3/1996 | Dory et al. | 367/34 |
| 6,020,741 A * | 2/2000 | Heysse et al. | 324/339 |
| 6,173,793 B1 | 1/2001 | Thompson et al. | 175/45 |
| 6,714,014 B2 | 3/2004 | Evans et al. | 324/374 |
| 6,794,875 B2 * | 9/2004 | Strickland | 324/343 |
| 6,900,640 B2 * | 5/2005 | Fanini et al. | 324/339 |
| 6,952,101 B2 * | 10/2005 | Gupta | 324/339 |
| 7,038,456 B2 * | 5/2006 | Ellingsrud et al. | 324/334 |

FOREIGN PATENT DOCUMENTS

CA           685727       5/1960

* cited by examiner

*Primary Examiner*—Zakiya W. Bates
(74) *Attorney, Agent, or Firm*—Madan, Mossman & Sriram, P.C.

(57) ABSTRACT

A pad mounted resistivity imaging device includes at least one transmitter and two or more arrays of receivers. Analysis of the received signals is done using either amplitude and phase differences between the arrays of receivers, or by analyzing amplitude and phase differences between the transmitters and the receivers. With operating frequencies in excess of 10 MHz, high resolution images of boreholes are obtained.

49 Claims, 15 Drawing Sheets

APPARATUS AND METHOD FOR WIRELINE IMAGING IN NONCONDUCTIVE MUDS

CROSS REFERENCES TO RELATED APPLICATIONS

This application is a continuation-in-part of U.S. patent application Ser. No. 10/616,857 of Chemali et al. filed on Jul. 8, 2003, now U.S. Pat. No. 6,957,708.

BACKGROUND OF THE INVENTION

1. Field of the Invention

This invention generally relates to explorations for hydrocarbons involving electrical investigations of a borehole penetrating an earth formation. More specifically, this invention relates to highly localized borehole investigations for obtaining an image of the borehole wall using induction logging.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. Such devices are referred to as galvanic sensors. In inductive measuring tools, an antenna within the measuring instrument induces a current flow within the earth formation. The magnitude of the induced current is detected using either the same antenna or a separate receiver antenna. The present invention belongs to the second category.

Obtaining an image of a borehole wall has hitherto been accomplished primarily by using galvanic sensors. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Pat. No. 685,727 to Mann et al. U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies.

One major drawback with the use of contact devices injecting electrical currents into a wellbore arises when oil-based muds are used in drilling. Oil-based muds must be used when drilling through water soluble formations: an increasing number of present day exploration prospects lie beneath salt layers. Oil has a high electrical resistivity and even a thin film of oil can greatly reduce the effectiveness of conduction-based devices for determination of formation resistivities.

U.S. Pat. No. 6,714,014 to Evans et al. having the same assignee as the present application and the contents of which are fully incorporated herein by reference, teaches an apparatus and method based on the use of high frequency measurements for injecting measure currents into the formation. One embodiment of the device and method taught in Evans uses a carrier frequency that is sufficiently high to capacitively couple the measure electrodes to the formation through the nonconducting mud. By modulating the carrier current at a frequency used in prior art resistivity imaging devices, it is possible to get measurements of formation resistivity with relatively minor changes in the hardware of prior art resistivity devices used with water based muds, the main modification being a modulator for producing the measure currents demodulator for demodulation of the measure currents.

U.S. patent application Ser. No. 10/616,857 of Chemali et al., having the same assignee as the present invention and the contents of which are fully incorporated herein by reference, teaches a measurement-while-drilling apparatus and method in which transmitters and receivers are mounted on stabilizers. At the operating frequencies of the Chemali device, the apparatus can be used with oil based muds. A hardfacing is used to reduce wear and to keep the transmitter and receiver antennas at a desired distance from the borehole wall. Azimuthal and vertical imaging is possible due to the fact that (i) measurements are made by a rotating sensor on the MWD device, giving azimuthal coverage, and, (ii) the relatively low rate of axial movement (ROP) of a MWD device. For wireline applications, simply mounting the sensor of Chemali on a wireline logging sonde would not be adequate to provide adequate resolution for imaging applications. The present invention fills a need for an inductive wireline imaging tool.

SUMMARY OF THE INVENTION

The present invention is an apparatus for investigating a borehole penetrating an earth formation and a method of using the apparatus. The apparatus includes an instrument conveyed into said borehole. The instrument has at least one extension device coupled to the body of said instrument, and a pad on the extension device that is moved to a position in proximity to a wall of said borehole. At least one transmitter on the pad produces an electromagnetic field in said earth formation. The pad has at least two arrays of receivers which produce signals resulting from the electromagnetic field. A processor determines from said signals a characteristic of the wall of the borehole. The instrument may be conveyed into the borehole on a wireline. The extension devices may be electrically operated, electromechanically operated, mechanically operated, or hydraulically operated. There may be a plurality of extension devices, each with its own pad, circumferentially distributed around the body of the instrument. The extension devices are capable of moving the pads so that the offset from the borehole wall is less than about one inch.

Two or more transmitters may be used, positioned on opposite sides of the two arrays of receivers. The transmitters may include coils that are oriented parallel to the instrument axis or may be orthogonal to the instrument axis. The transmitter coils may extend around 2 inches along a direction parallel to the instrument axis. Alternatively, the transmitters may include dipole antennas.

Transmitters and receivers may be set in one or more recesses on the pad. Each receiver array includes several receivers positioned circumferentially on the pad. The receivers in an array may be positioned non-overlapping or overlapping with one another in the circumferential direction. The longitudinal resolution of an image of the borehole wall obtained by the instrument depends upon a longitudinal separation between the two arrays of receivers.

The apparatus may be used to identify a conductive layer in a resistive background or a resistive layer in a conductive background. Operating frequency of the apparatus is typically greater than 10 MHz. The processor may be downhole, at a surface location, or at a remote location. Processing of the signals done by the transmitter may include determination of amplitude ratios and/or phase differences of signals in the two arrays. When used in a deviated borehole, a dip angle of the formation relative to the instrument may be determined.

BRIEF DESCRIPTION OF THE FIGURES

The present invention is best understood by reference to the following figures wherein like numbers refer to like components, and wherein:

FIG. 12 is similar to FIG. 9 except that transmitter coils are 2 in high (instead of 4 in). and the distance from the transmitter center to the near receiver is reduced from 4 in to 2 in;

DETAILED DESCRIPTION OF THE INVENTION

Figure 1:
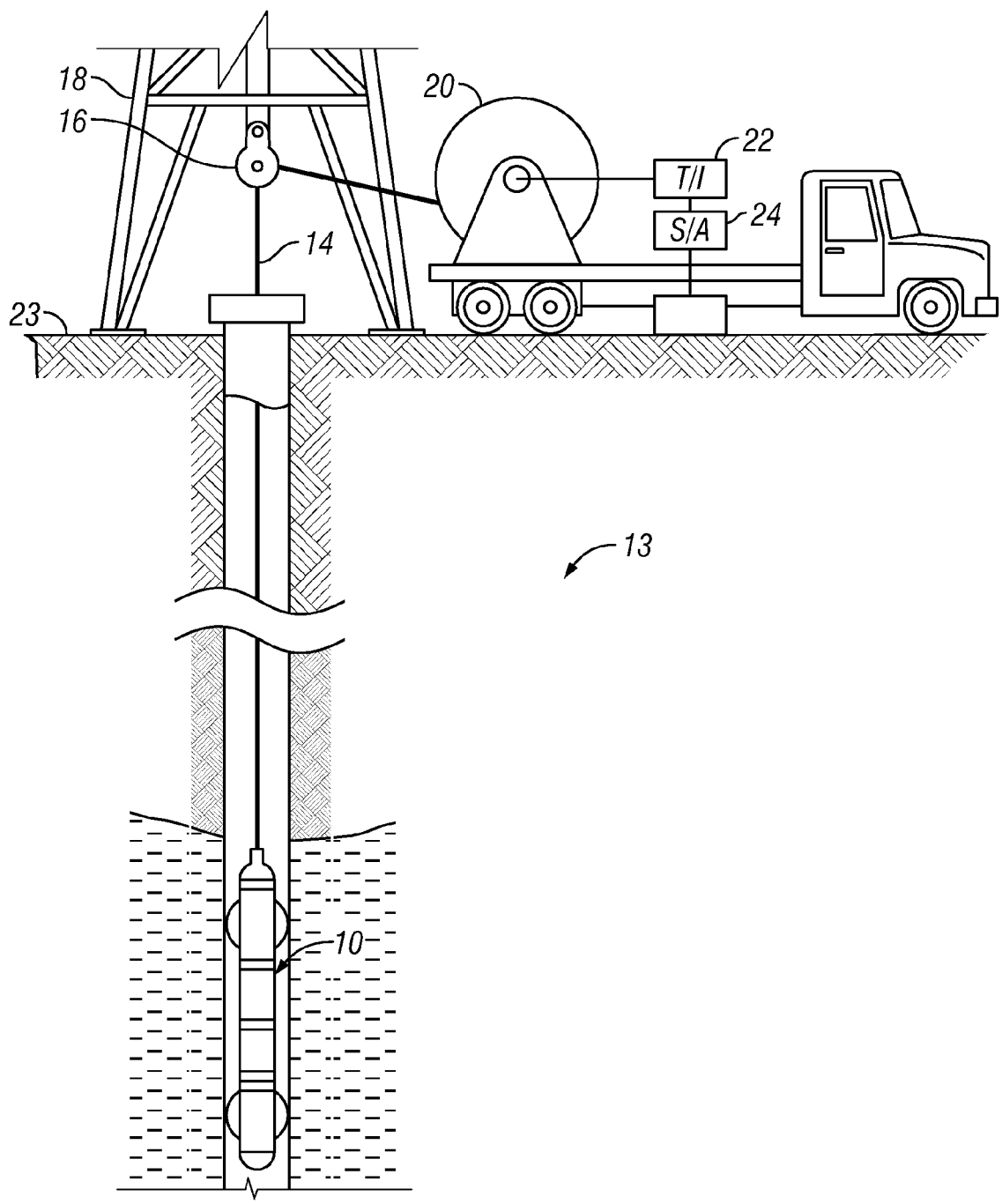
FIG. 1 (prior art) schematically illustrates a wireline logging tool suspended in a borehole.

FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some or all of the processing may also be done by using a downhole processor at a suitable location on the logging tool 10.

The imaging tool consists of at least one transmitting antenna and two receiving loop antennas mounted on a pad. The tool may be operated in one of two modes. The first mode is referred to as Mini-MPR (Multiple propagation resistivity) mode that measures attenuation and phase difference between the two receivers. The tool may also be operated in the induction mode in which a compensated magnetic field (voltage) is measured. The principles of induction logging are discussed, for example, in U.S. Pat.

No. 4,455,929 to Sinclair. In brief, The current in the transmitter coil induces a magnetic field in the formations. This magnetic field, in turn, causes eddy currents to flow in the formations. Because of the presence of these formation currents, a magnetic field is coupled into a receiver coil R thereby generating a receiver signal. As noted in Sinclair, logging tools having "a receiver coil" and "a transmitter coil" each comprised of several coils arranged in a predetermined fashion to obtain a desired response are commonly used. The receiver signal is then amplified and applied to one or more phase sensitive detectors (PSDs). Each PSD detects a phase component signal having the same phase as a phase reference signal which is also applied to the detector. The phase reference signal has a predetermined phase relationship to the current in the transmitter coil(s). The output of the PSD(s) may be further processed downhole, or may be sent uphole to surface equipment for processing or display to an operating engineer.

In the context of the present invention, in the induction mode, one receiver loop coil serves as the main receiver and the other as the bucking receiver. The transmitting antennas can be either loops and or electric dipoles, as discussed later. For loop transmitter antennas, the transmitters and receivers may be in one of three orientations. We define the z-axis of the tool as being parallel to the longitudinal axis of the tool, the x-axis as being radial through the center of the pad, and the y-axis as being tangential to the pad. The zz-component would then refer to a z-source and a z-receiver and so on. In a particular embodiment of the invention, xx-transmitters and receivers are used. This has been found to give the best results in terms of vertical resolution, azimuthal resolution, and tolerance to standoff.

Figure 2A:
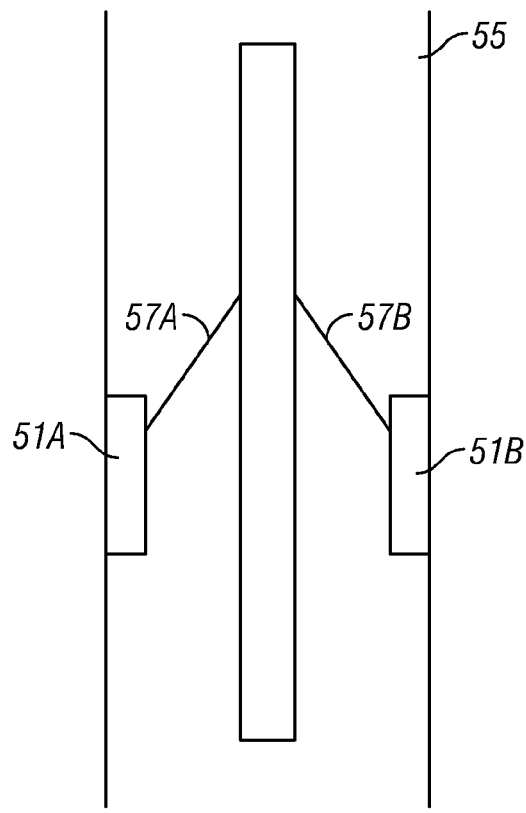
FIG. 2*a* illustrates a logging tool with two pads on extendable arms.

Turning now to FIG. 2a, a logging sonde with a body 55 is shown with two pads 51a, 51b extended on extension devices 57a, 57b. Two pads are shown for illustrative purposes and in actual practice, there may be more pads. The extension devices may be electrically operated, electromechanically operated, mechanically operated or hydraulically operated. With the extension devices fully extended, the pads can make contact with the borehole wall (not shown) and make measurements indicative of properties of the borehole wall. The present invention is suitable for use in boreholes filled with non-conductive oilbased muds. Not shown are orientation sensors that provide an indication of the orientation of the logging sonde. In addition, cable depth measurements using a sensor at the surface that measures the amount of cable spooled out. In addition, accelerometers may be used downhole to provide other measurements indicative of the depth of the sonde. Known methods are used for estimating the depth of the sonde from the surface measurements and/or the accelerometer measurements. The orientation sensors may include accelerometers, magnetometers or gyroscopes. Depth may also be estimate from the gyro output.

Figure 2B:
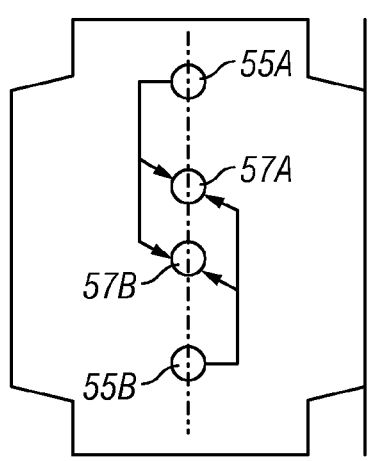
FIG. 2*b* illustrates the antenna configuration in one embodiment of the invention.

An exemplary arrangement of dual transmitters and receivers on each of the pads is shown in FIG. 2b. Shown therein is pad 51a with two transmitters 55a, 55b disposed about two receivers 57a, 57b. Also depicted schematically by arrows in FIG. 2b are measurements that may be made, i.e., by each of the two receivers corresponding to signals generated by each of the two transmitters.

The use of dual transmitters has at least three benefits. First, the response is symmetrical. Secondly, effects of borehole rugosity are reduced. Thirdly, electronics-related errors in attenuation measurement are reduced, all of which have been shown in conventional MPR tools. The electronics-related errors do not affect the phase difference measurement. The last advantage can be shown, e.g., for the Mini-MPR mode. The two transmitters are placed symmetrically with respect to the receiver antennas. Attenuation and phase difference are measured for each of the transmitters. The measurements are averaged to give the final readings:

$$Att = \frac{Att_{T1} + Att_{T2}}{2} \quad (1)$$

$$Pha = \frac{Pha_{T1} + Pha_{T2}}{2}$$

where the subscripts T1 and T2 denote the first and second receivers. Consider a (uniform) formation for which the magnetic fields at the receiver locations are H1 and H2. Assuming that the two receivers have gains G1 and G2, the ratio of the two receiver outputs $R_{T1}$ for the $1^{st}$ transmitter is derived from the ratio:

$$R_{T1} = \frac{G_2 H_2}{G_1 H_1} = \frac{G_2}{G_1}\frac{A_2}{A_1}e^{i\Delta\phi} \quad (2)$$

where A1 and A2 are the amplitudes of H1 and H2, respectively; $\Delta\phi$ is the phase difference between the two receivers. From eqn. (2) we have $$Att_{T1} = -20\log\frac{G_2}{G_1} - 20\log\frac{A_2}{A_1}, \quad (3)$$

$$Pha_{T1} = \Delta\phi. \quad (4)$$

It is clear that the phase difference measurement is not affected by the gain change but the attenuation measurement is.

Similarly, attenuation measurement for the $2^{nd}$ transmitter is derived from $$R_{T2} = \frac{G_1 H_2}{G_2 H_1} = \frac{G_1}{G_2}\frac{A_2}{A_1}e^{i\Delta\phi}. \quad (5)$$

The attenuation measurement is written as $$Att_{T2} = -20\log\frac{G_1}{G_2} - 20\log\frac{A_2}{A_1}. \quad (6)$$

Obviously, averaging equations (2) and (3) will remove the effect of gain variation. Those versed in the art would recognize that measurements of amplitude and phase can, in addition to resistivity determination, also be used for determining the dielectric constant of the earth formation. This is discussed, for example, in U.S. Pat. No. 5,811,973 to Meyer having the same assignee as the present invention and the contents of which are incorporated herein by reference.

Figure 3A:
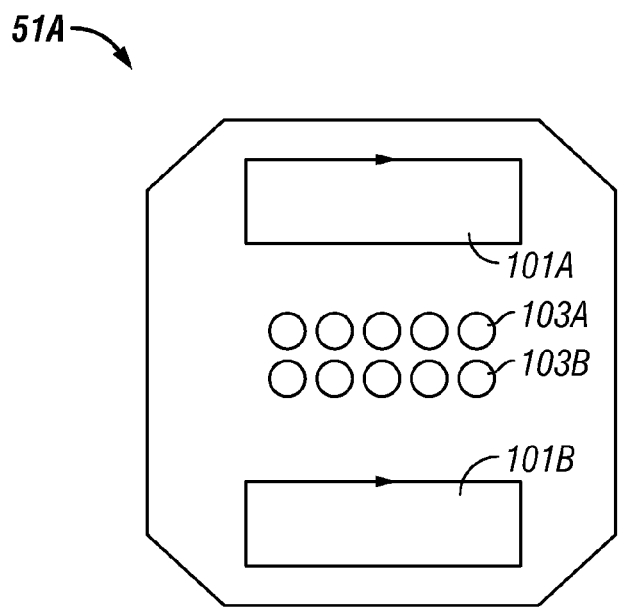
FIG. 3*a* illustrates one arrangement of transmitters and receivers of the invention.

For wireline imaging application, multiple receiver pairs of receivers are used to achieve sufficient azimuthal coverage. A generic tool configuration is shown in FIG. 3a. Two receiver arrays denoted by 103a, 103b are placed on a pad 51a. For each receiver in the upper array, there is a corresponding receiver in the lower array. In one embodiment of the invention, the coils of the upper and lower receiver arrays are aligned radially with respect to the tool axis (movement) direction. The receiver coils are separated laterally by a constant distance that is determined by the azimuthal resolution of the imaging tool. Two transmitting antennas are placed above 101*a* and below 101*b* the receiver arrays. The transmitters are operated one at a time during which measurements from each and every receiver pairs are made. An exemplary current flow direction for the transmitters is shown by the arrows in FIG. 3*a*. With the indicated current flow of the transmitters and the coil orientation of the receivers, the measurements made would be xx-measurements. The measurement is attenuation rate, phase difference, or compensated magnetic field.

Figure 3B:
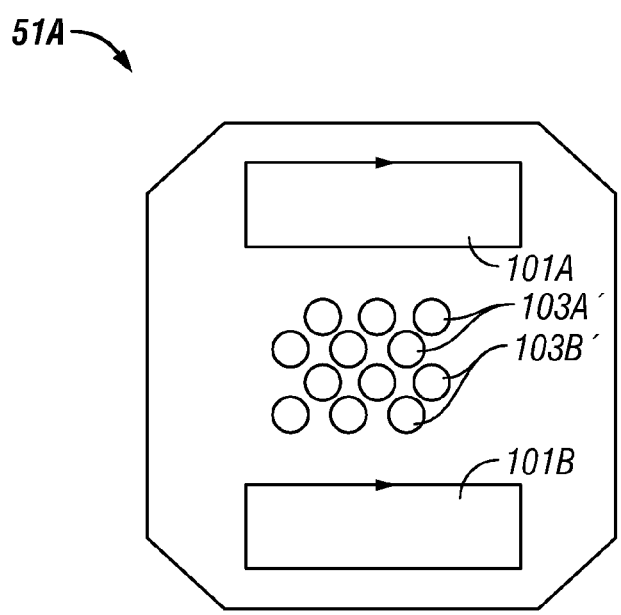
FIG. 3*b* illustrates an arrangement of transmitters and staggered receivers of the invention.

Depending on the size of the receiver coils, the receiver pairs may be staggered in the tool axis direction, allowing a small separation between the receiver pairs. This is shown in FIG. 3*b* where the upper receiver array 103*a*' comprises two staggered rows of receivers and the lower receiver array 103*b*' comprises two staggered rows of receivers to reduce the gaps in azimuthal coverage of the configuration of FIG. 3*a*.

Figure 4A:
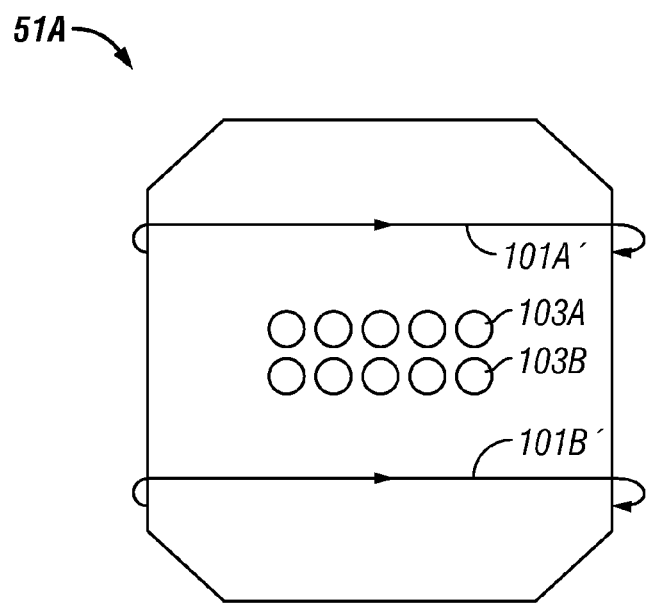
FIG. 4*a* illustrates a transmitter with winding around the pad, and receivers in another embodiment of the invention.

Likewise, the transmitters can be wound in several different ways. FIG. 4*a* depicts transmitters 101*a*' and 101*b*' with wires wound around the pad. The wire paths are substantially normal to the tool axis, going in the front, back, and on sides of the pad. With the configuration shown in FIG. 4*a*, the measurements would be zx-measurements.

Figure 4B:
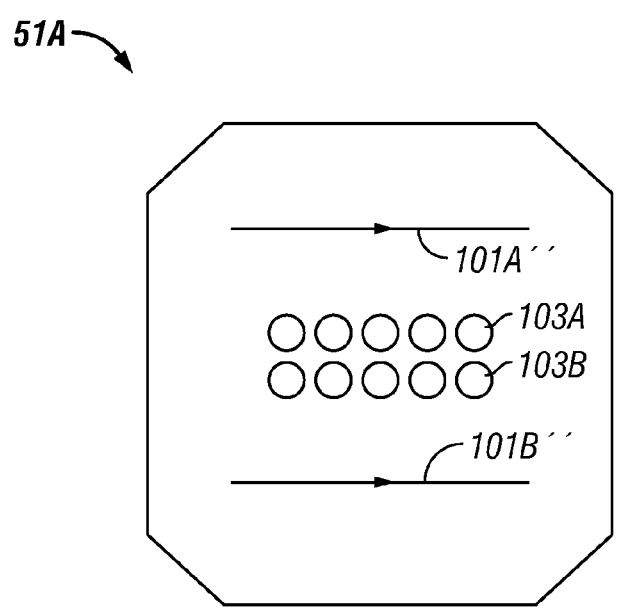
FIG. 4*b* illustrates a dipole transmitter and receivers in an embodiment of the invention.

The transmitters can also be electric dipoles (shown by 101*a*" and 101*b*") normal to the tool axis (FIG. 4*b*). It should be noted that in the vicinity of the receiver coils, the magnetic field created by a loop wire shown in FIG. 3*a* or 3*b* is similar to that by an electric dipole.

Figure 5:
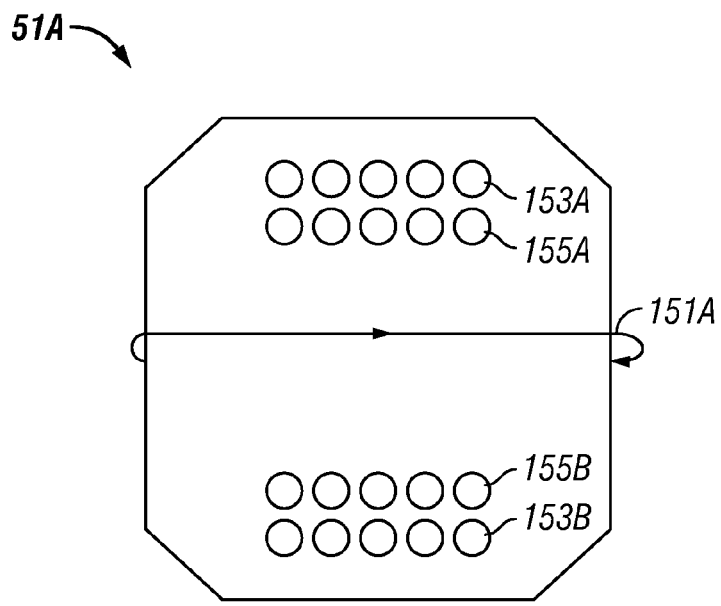
FIG. 5 illustrates a configuration in which receiver arrays are positioned on either side of a transmitter on a pad.

As FIG. 5 shows, two groups of receiver pairs are placed symmetrically above 153*a*, 155*a* and below 153*b*, 155*b* the transmitter loop 151. Measurements for the same receiver positions are collected to form dual-transmitter measurements.

Figure 6:
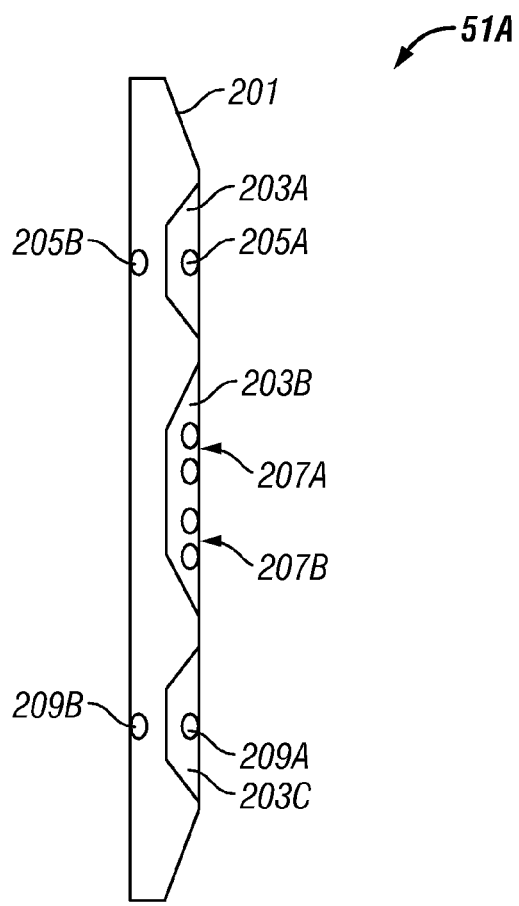
FIG. 6 is a cross sectional view of possible coil windings.

It should be noted that with any of the configurations shown in FIGS. 4*a*, 4*b*, 5, staggered receivers such as those shown in FIG. 3*b* may be used. The antennas can be built on either insulating or conductive pads. To build antennas on a conductive pad, cavity must be created to host the antenna wires. A gap between an antenna wire and the conductive pad may be used. FIG. 6 schematically illustrates a possible implementation of antennas on a conductive pad. This corresponds to the transmitter antenna illustrated in FIG. 4*a*. The pad 41*a* which includes a conductive body 201*a* is shown. The upper transmitter antenna and the lower transmitter antenna are denoted by (205*a*, 205*b*) and (209*a*, 209*b*) respectively. The two receiver antennas are denoted by 207*a*, 207*b*. The cavities or recesses for the antennas are denoted by 203*a*, 203*b*, 203*c*.

Figure 7:
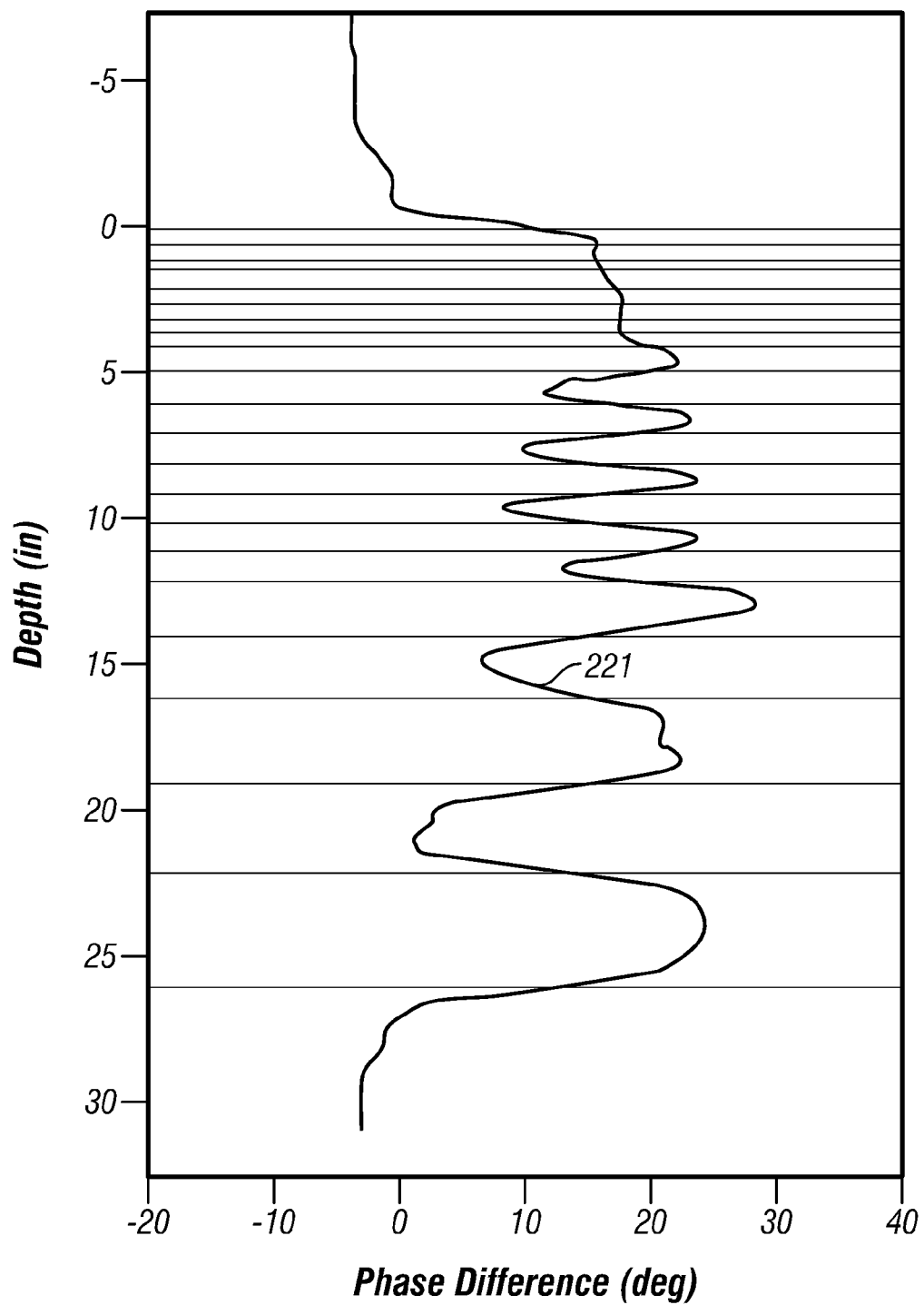
FIG. 7 shows a response of one embodiment of the invention with a receiver spacing of 1 inch to a sequence of thin beds.
Figure 8:
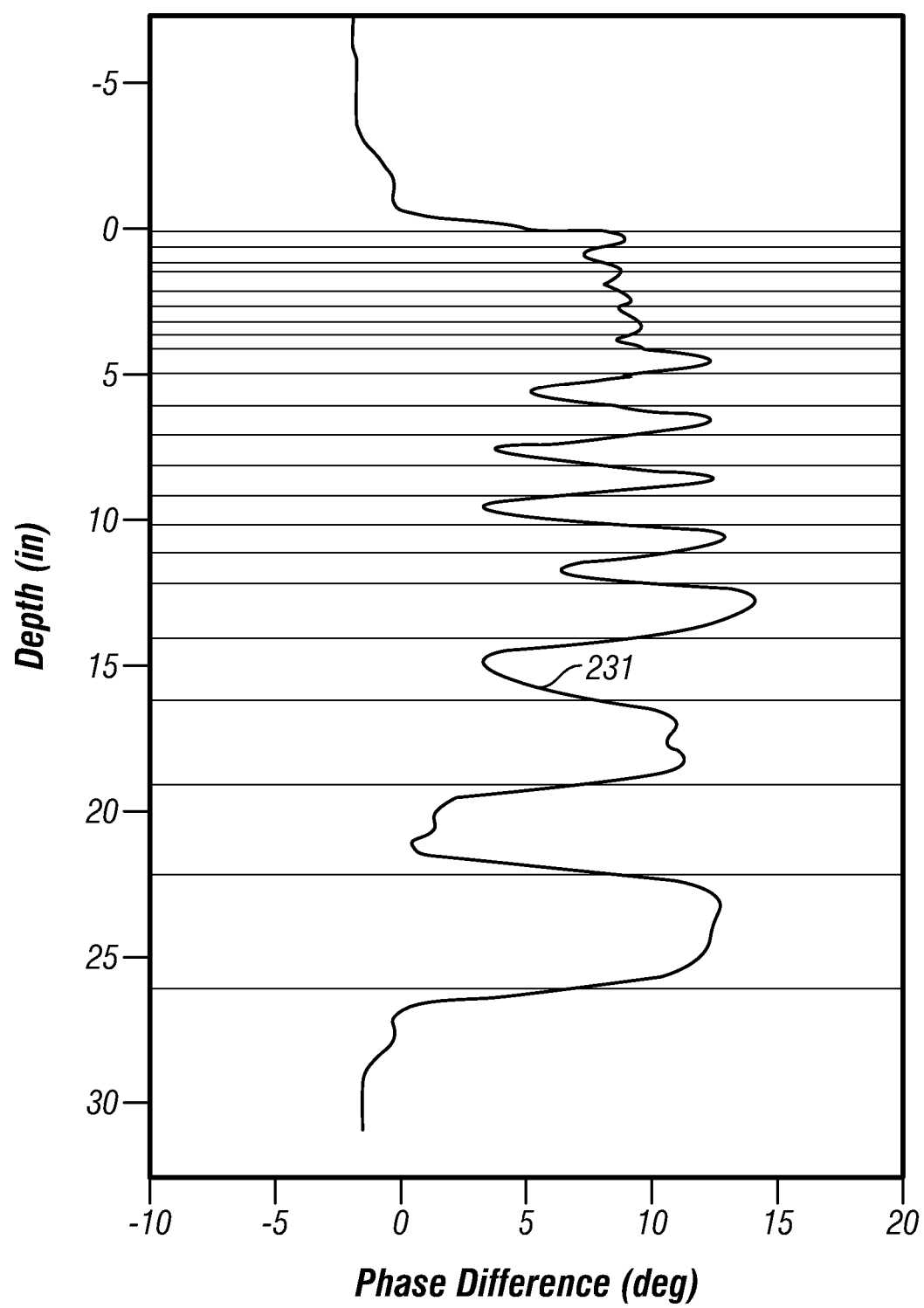
FIG. 8 shows the with a receiver spacing of 0.5 inches to the same sequence of thin beds as in FIG. 7.

In the following, we illustrate the tool response for a Mini-MPR device shown in FIG. 3*b* by considering only one pair of receiver coils located in the middle of the two receiver arrays. The vertical resolution of the Mini-MPR tool is controlled by the receiver spacing. Shorter receiver spacing yields higher resolution. The model comprises alternating layers of resistivity 10 Ω-m and 1 Ω-m of increasing thickness from top to bottom. The abscissa is the phase difference between the antennas. The ordinate is depth in inches. The tool standoff was ⅛" (3.174 mm). A frequency of 200 MHz was used. With a receiver spacing of 1" (2.54 cm), FIG. 7 shows that the 1" (2.54 cm) are resolved with a phase difference of about 15°. See 221. Curve 231 of FIG. 8 shows model results for a receiver spacing of 0.5" (1.27 cm) and shows that layers of 0.5" (1.27 cm) are resolvable. This indicates that the vertical resolution is determined at least in part by the receiver spacing. Of course, the receiver spacing must be large enough to ensure accurate measurement of both attenuation and phase difference between the two receivers.

Figure 9:
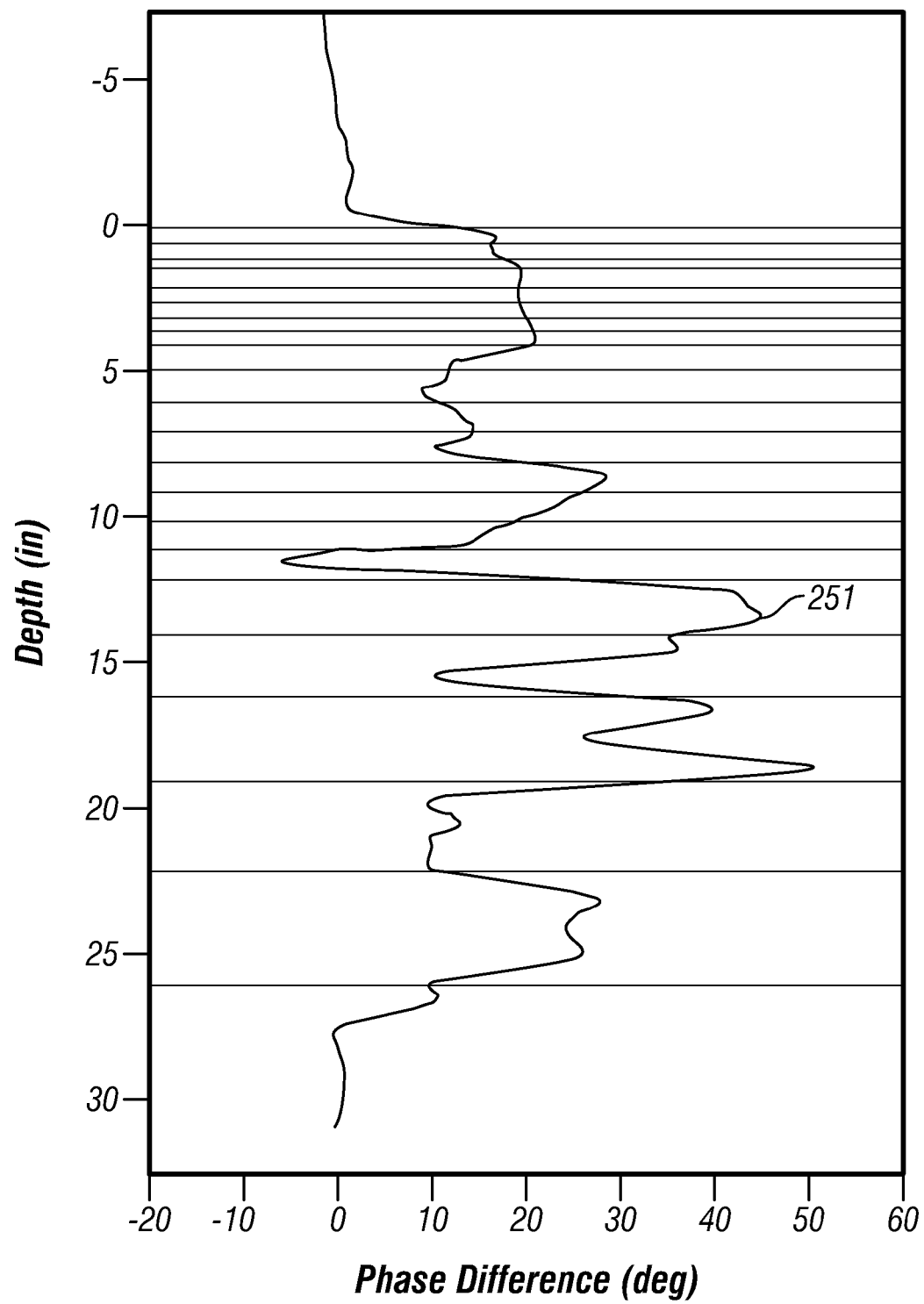
FIG. 9 shows the with a dipole transmitter for the same receiver configuration and sequence of thin beds as in FIG. 7

We next examine the effect of the transmitter coil size on image quality. It appears that a relatively large transmitting coil produces more interpretable image than a small one and helps improve the image resolution. The data in FIG. 7 were obtained with 4"×4" (10.16 cm×10.16 cm) transmitter coils. For comparison, FIG. 9 shows the image response for a dipole transmitter coil (i.e., one in which one of the antenna has substantially zero length in the z-direction). The distance between the transmitter center and the near receiver is maintained the same (4 in). It is clear that the larger transmitter loops produce much stable image response. More importantly, the larger transmitter coils improve the vertical resolution.

We next examine the effects of borehole rugosity. We distinguish between two types of rugosity: long-wavelength rugosity and short-wavelength rugosity. Long-wavelength rugosity, as caused by bit spiraling, often appears as periodic features with wavelengths around 1 to 3 ft (0.3 m–0.9 m) and hole enlargement up to 0.5" (1.3 cm) or more. Borehole breakouts are also long-wavelength rugosity. Because of its extended coverage, long-wavelength rugosity presents a serious challenge to resistivity imaging in non-conducting muds. Short-wavelength rugosity includes vugs, spalls, and other small features. The effects are local and may be less severe than those caused by long-wavelength rugosity. We illustrate the effects of both types of borehole rugosity on the Mini-MPR imaging device.

Figure 10:
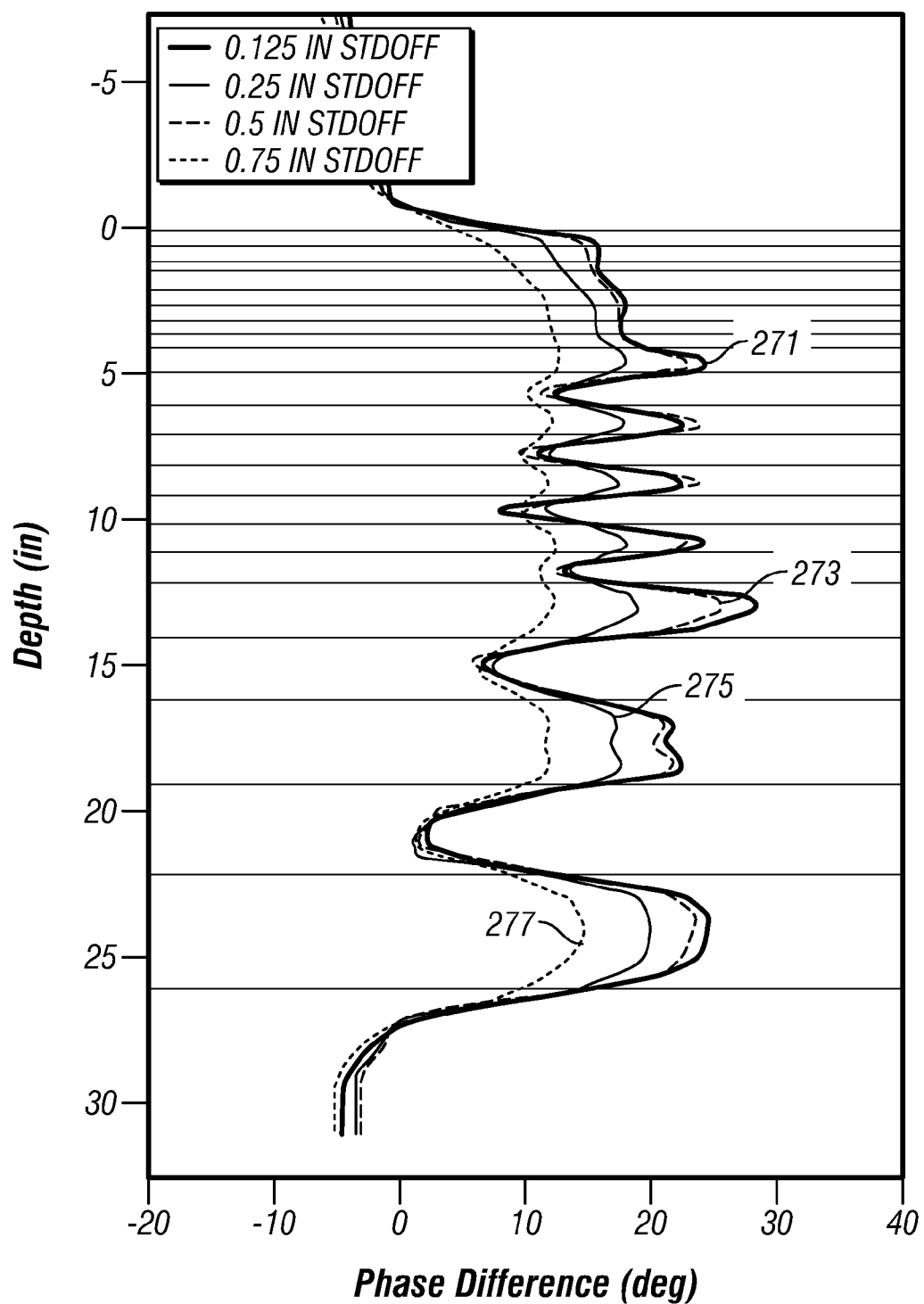
FIG. 10 illustrates the tool response for various tool standoffs up to ¾ in with a resistive background model.

Referring now to FIG. 10, the response to the same model is shown for standoffs of 0.125 in, 0.25 in, 0.5 in and 0.75 in (0.3175 cm, 0.635 cm, 1.27 cm and 1.905 cm) denoted by 271, 273, 275 and 277 respectively. We note that: tool standoff up to 0.25 in has little effect on the measurement and that a 1 in resolution can be obtained even with ¾ in standoff. The tool standoff affects mostly the conductive beds, and the relation between the low and high values is retained for standoff up to ¾ in standoff.

Figure 11:
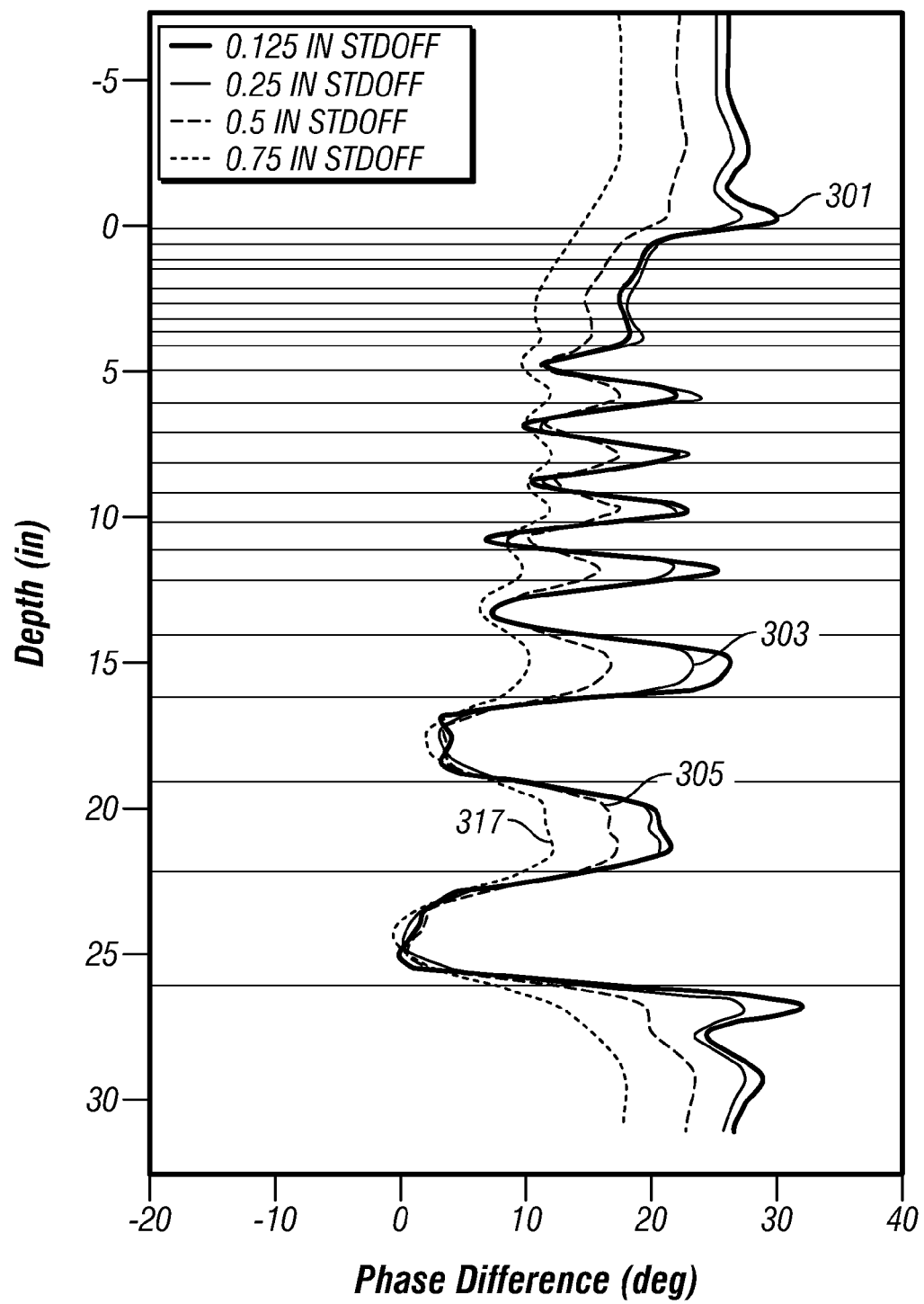
FIG. 11 is similar to FIG. 10 with a conductive background model.

Conductive beds are more affected by standoff. The larger standoff effect on conductive beds is further illustrated with a model having a conductive background. The model used for FIG. 11 has a background resistivity of 1 Ω-m and layers with 10 Ω-m resistivity. The response to the same model is shown for standoffs of 0.125 in, 0.25 in, 0.5 in and 0.75 in (0.3175 cm, 0.635 cm, 1.27 cm and 1.905 cm) denoted by 301, 303, 305 and 307 respectively. As FIG. 11 shows, the effect is clearly observed in the shoulder beds above and below the thin-bed sequence. Also notice the boundary effect created by the tool. This effect may be reduced by using smaller transmitter coils with shorter transmitter-receiver spacings.

Figure 12:
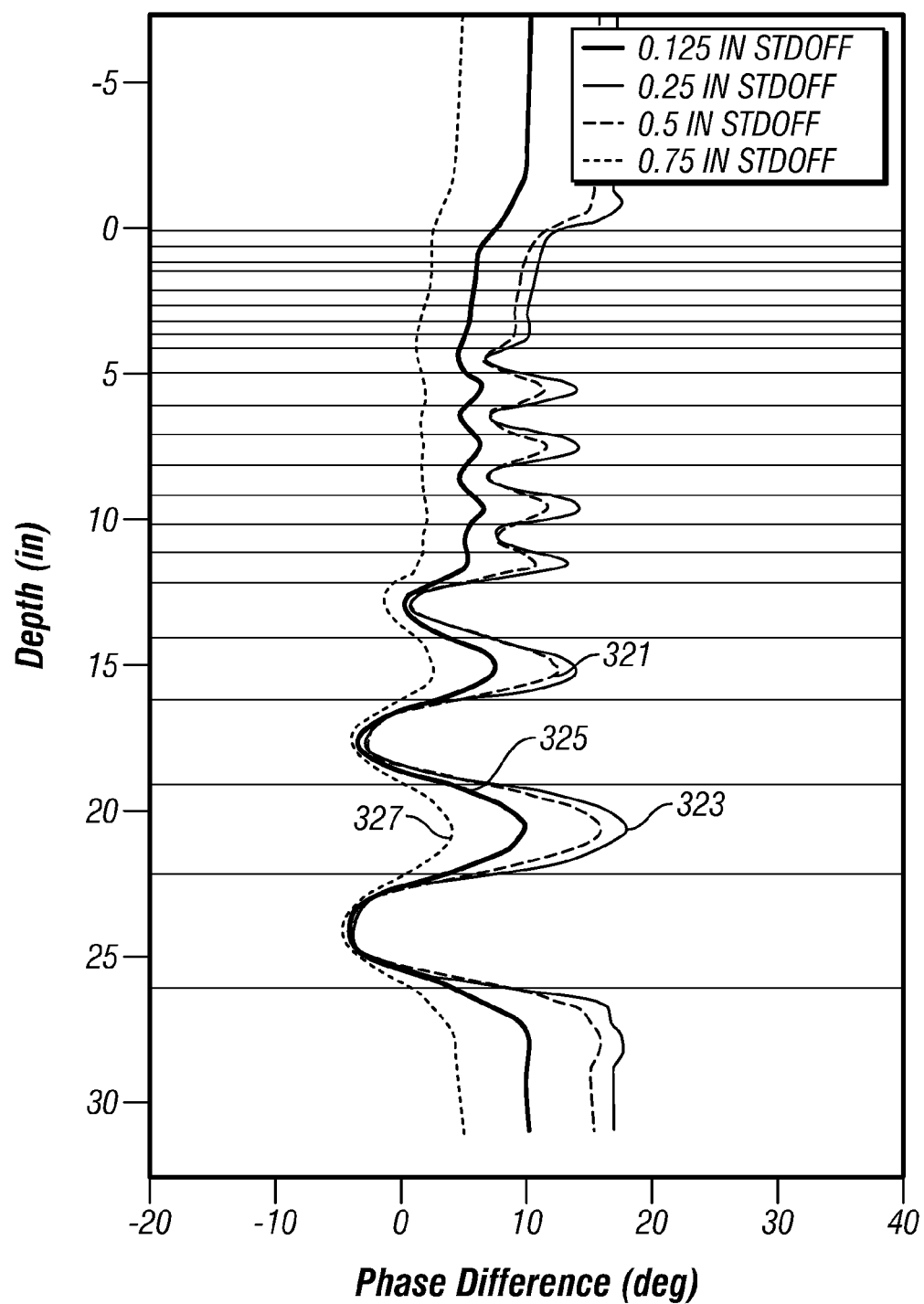
Figure 13:
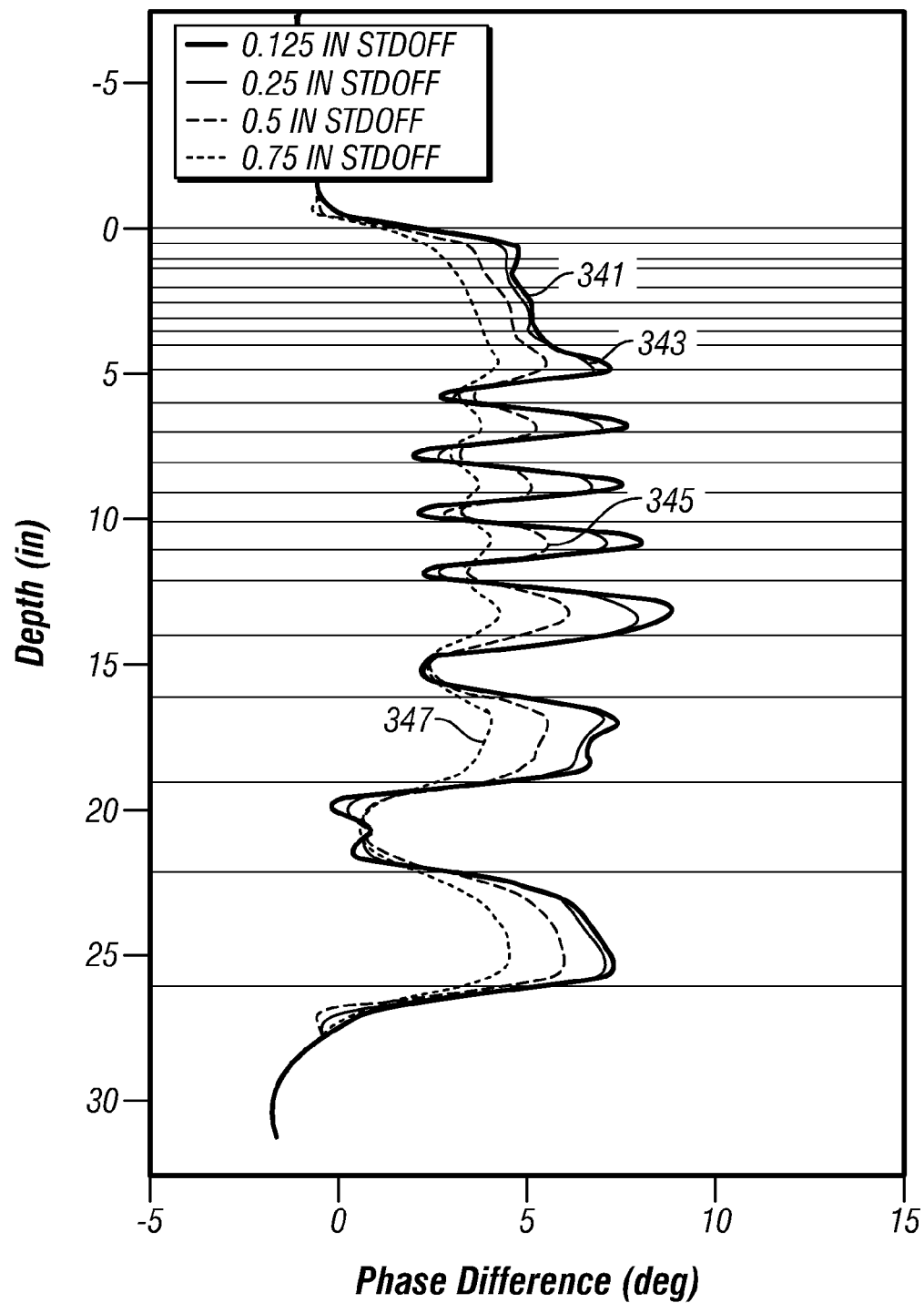
FIG. 13 illustrates the effect of the operating frequency of the transmitter.

To demonstrate, FIG. 12 shows the image response for 2 in×2 in transmitter coils with the transmitter-receiver spacing reduced to 2 in for the same model as in FIG. 11. The response to the same model is shown for standoffs of 0.125 in, 0.25 in, 0.5 in and 0.75 in (0.3175 cm, 0.635 cm, 1.27 cm and 1.905 cm) denoted by 321, 323, 325 and 327 respectively. It is clear the boundary effect is significantly reduced. However, the 1-in. resolution is likely lost at a tool standoff of ¾ in. Hence, the larger transmitter coils and longer transmitter-receiver spacing are preferred for the sake of the depth of investigation. The large depth of investigation helps reduce the standoff and borehole rugosity effects FIG. 13 shows modeling results for a resistive background with an operating frequency of 50 MHz. The response to the same model is shown for standoffs of 0.125 in, 0.25 in, 0.5 in and 0.75 in (0.3175 cm, 0.635 cm, 1.27 cm and 1.905 cm) denoted by 341, 343, 345 and 347 respectively. The results are not significantly different from those of FIG. 10. Additional modeling results (not shown) indicate that frequencies as low as 10 MHz may be used while still having the 1 in. resolution.

Figure 14A:
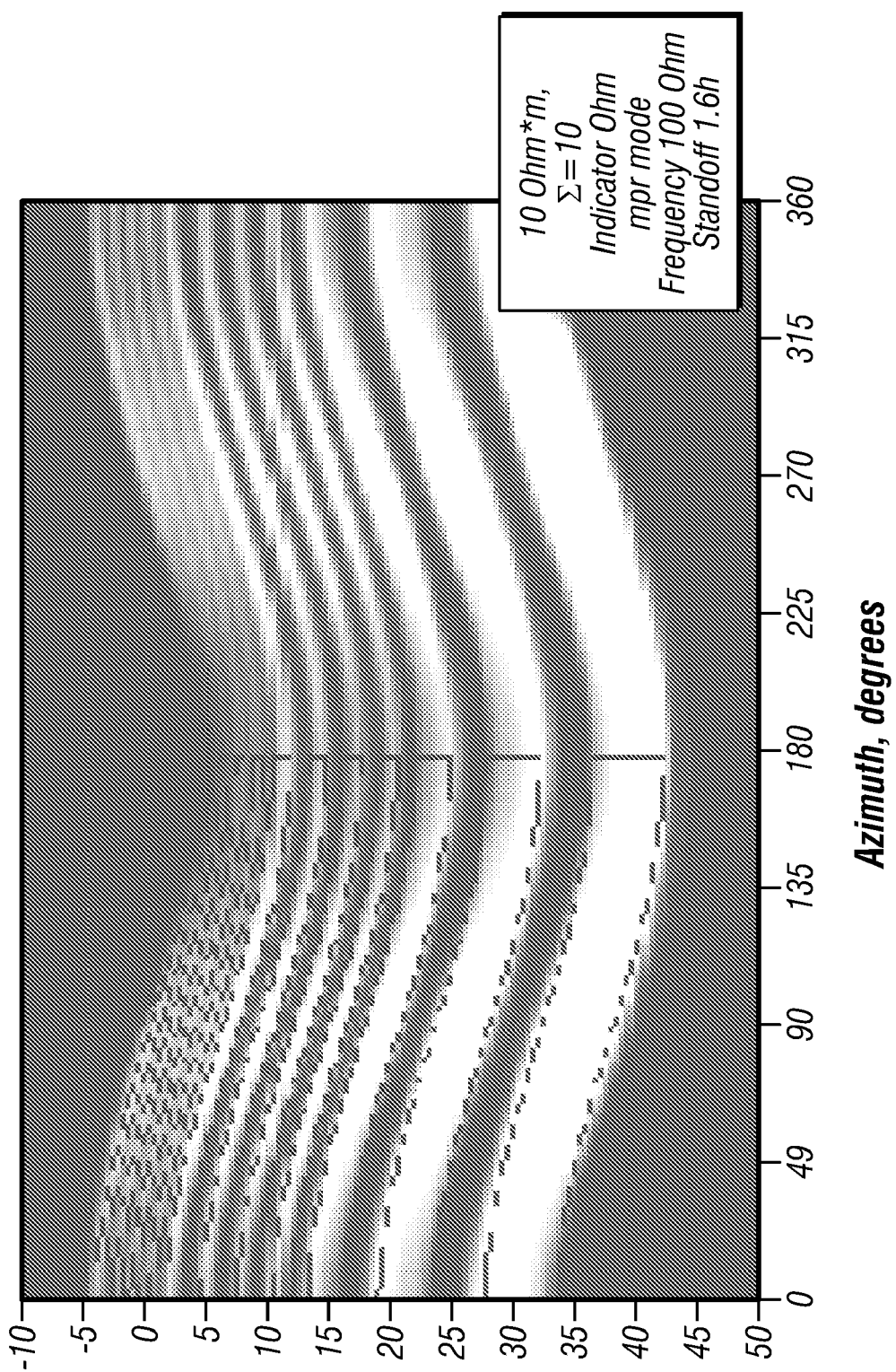
FIGS. 14*a*, 14*b* illustrate the correction for the electric diameter of the tool.
Figure 14B:
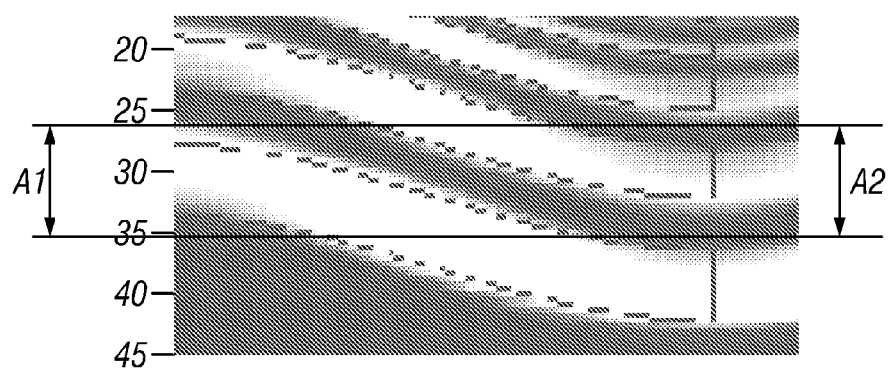

Azimuthal resolution of the invention may be tested using measurements in a deviated borehole. FIG. 14 shows the image response to a layered formation with a 45° dip between the borehole and the bedding. The transmitter antennas were similar to those in FIG. 4a. FIG. 14 shows that the phase difference measurement resolves the one inch beds. To phenomena are worth noting. First, "halos" appear in the up-dip and down-dip positions. This has been well known in galvanic resistivity imaging. Secondly, the image has a larger apparent dip than the true dip of 45°. This is due to the fact that the imaging tool sees some distance into the borehole. Consequently, the "electric diameter" of the tool is greater than the actual borehole diameter. When the larger amplitude of the sinusoid (A2 in FIG. 14b) at the larger effective diameter is divided by the actual borehole diameter, an erroneously large dip value results. The relative dip is determined by applying a correction to the borehole diameter to give the result:

$$\theta = \tan^{-1}\left(\frac{A_2}{D + \Delta E}\right) \quad (7)$$

where θ is the relative dip angle, $A_2$ is the amplitude of the sinusoid as seen on the dip image, D is the borehole diameter and ΔE is a correction to the borehole diameter. Without the borehole correction, the relative dip would be given by $$\theta = \tan^{-1}\left(\frac{A_1}{D}\right) \quad (8)$$

where $A_1$ is indicated in FIG. 14b. Relative strike of the boundary is given by any suitable reference point on the sinusoid, such as the peak or a trough. From the knowledge of relative dip and relative strike, the absolute dip and aboslute strike of the boundary may be estimated using measurements from the orientation sensors, and survey information on the borehole inclination.

In operation of the tool, as would be known to those versed in the art, there would generally be gaps in the image obtained using sensors on a plurality of extendable pads. For this reason, additional processing (including interpolation) would be necessary on field data to obtain continous coverage over 360° as seen in FIG. 14a. This interpolatoin is usually done either at a surface processor or at a location remote from the wellsite.

Figure 15:
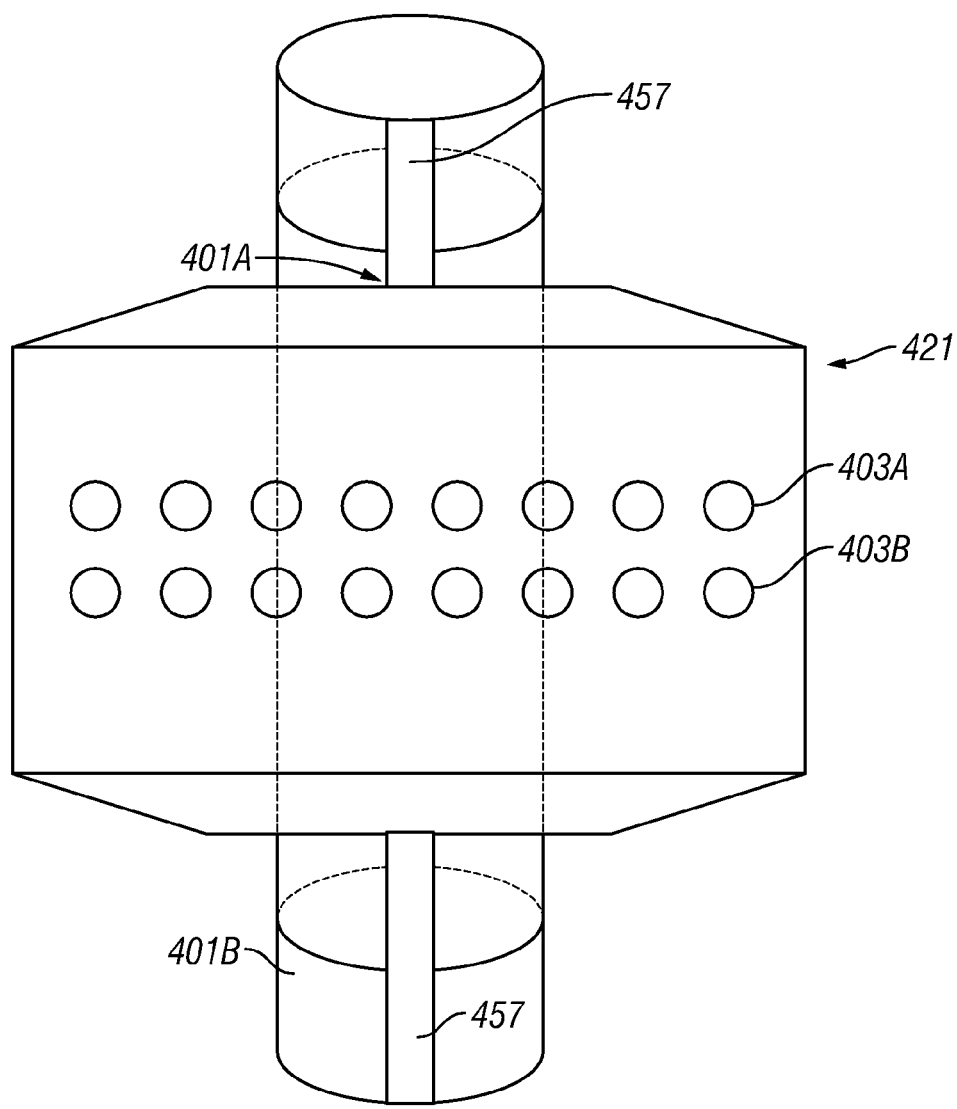
FIG. 15 is a schematic illustration of a tool in which the transmitters are on the tool mandrel.

In an alternate embodiment of the invention shown in FIG. 15, only the receiver arrays are pad mounted. Shown in FIG. 15 are two transmitter coils 401a, 401b that are on the tool mandrel. The two receiver arrays 4031, 403b are on the pad 421. To simplify the illustration, only one pad is shown. The extension devices are shown by 457. With the transmitter configuration shown, the induced magnetic field has a z-(loingitudinal) orientation, while the receiver arrays are x-(transverse) oriented receivers. As disclosed in U.S. patent application Ser. No. 10/373,365 having the same assignee as the present invention and the contents of which are fully incorporated herein by reference, the cross components are particularly useful in determining a distance to a bed boundary and an azimuth of a bed boundary in near horizontal boreholes.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing, or may be used on a device conveyed on a slickline.

While the foregoing disclosure is directed to the preferred embodiments of the invention, various modifications will be apparent to those skilled in the art. It is intended that all variations within the scope of the appended claims be embraced by the foregoing disclosure.

What is claimed is:

1. An apparatus for investigating an earth formation, the apparatus comprising:
   (a) an instrument conveyed into a borehole in said earth formation, the instrument including;
      (A) at least one transmitter configured to produce an electromagnetic field in said earth formation, and
      (B) at least two arrays of receivers configured to produce signals responsive to said electromagnetic field; the at least two arrays being displaced from the at least one transmitter along a longitudinal direction of the instrument; and
   (b) a processor in communication with said at least two arrays of receivers, the processor configured to determine from said signals a characteristic of said earth formation;
   wherein at least one of (I) said at least one transmitter, and, (II) said at least two arrays of receivers are positioned in proximity to a wall of the borehole.

2. The apparatus of claim 1 wherein said borehole has a substantially non-conducting fluid therein.

3. The apparatus of claim 1 further comprising an orientation sensor configured to determine an orientation of said body of said instrument.

4. The apparatus of claim 1 further comprising a wireline configured to convey said instrument into said borehole.

5. The apparatus of claim 1 wherein at least one of (I) the at least one transmitter, and (II) the at least two arrays of receivers are positioned on a pad coupled by an extension device to a body of the instrument.

6. The apparatus of claim 5 wherein said at least one extension devices is one of (i) electrically operated, (ii) electromechanically operated, (iii) mechanically operated, and, (iv) hydraulically operated.

7. The apparatus of claim 5 wherein said at least one extension device comprises a plurality of extension device disposed circumferentially around said body of said instrument.

8. The apparatus of claim 5 wherein said at least one transmitter and said at least two arrays of receivers are positioned on said pad.

9. The apparatus of claim 8 wherein said at least one transmitter comprises at least two transmitters, said at least two transmitters positioned on said pad on opposite sides of said at least two arrays of receivers.

10. The apparatus of claim 8 wherein said at least one transmitter comprises a coil with an axis substantially orthogonal to a longitudinal axis of said instrument.

11. The apparatus of claim 10 wherein said coil has a longitudinal extent greater than about 2 inches (5.08 cm).

12. The apparatus of claim 8 wherein said at least one transmitter comprises
a coil with an axis substantially parallel to a longitudinal axis of said instrument.

13. The apparatus of claim 8 wherein a conductor of said at least one transmitter is set in a recess on said pad.

14. The apparatus of claim 8 wherein conductors for said at least two arrays of receivers are set in a recess on said pad.

15. The apparatus of claim 8 wherein receivers of one of said at least two arrays of receivers are disposed circumferentially on said pad with respect to a longitudinal axis of said instrument.

16. The apparatus of claim 15 wherein said receivers of said one of said at least two arrays are positioned in at least two rows spaced apart longitudinally and overlap circumferentially.

17. The apparatus of claim 15 wherein said receivers of said one of said at least two arrays are circumferentially non-overlapping.

18. The apparatus of claim 1 wherein said at least one transmitter comprises
a coil on said body of said instrument, said coil having an axis substantially parallel to a longitudinal axis of said instrument,
to a longitudinal axis of said instrument.

19. The apparatus of claim 1 wherein said at least one transmitter comprises
a dipole antenna.

20. The apparatus of claim 1 wherein said characteristic of said formation comprises at least one of (i) an image of a wall of said borehole, (ii) a resistivity of said earth formation, (iii) a dielectric constant of said earth formation, (iv) a relative dip of of a boundary of said earth formation, and, (v) a relative strike of a boundary of said earth formation.

21. The apparatus of claim 20 wherein said characteristic of said formation comprises an image of said wall, and wherein a longitudinal resolution of said image is determined in part by a longitudinal separation of one of said at least two arrays of receivers and another of said at least two arrays of receivers.

22. The apparatus of claim 20 wherein said earth formation comprises at least one of (i) a resistive layer in a conducting material, and (ii) a conductive layer in a resistive material.

23. The apparatus of claim 1 wherein said electromagnetic field has a frequency greater than about 10 MHz.

24. The apparatus of claim 1 wherein said processor is at one of (i) a downhole location, and (ii) a surface location.

25. The apparatus of claim 1 wherein said processor is further configured to determine said characteristic from at least one of (i) an amplitude difference between one of said signals at a receiver of one of said at least two arrays of receivers and one of said signals at a receiver of another one of said at least two arrays of receivers, (ii) a phase difference between one of said signals at a receiver of one of said at least two arrays of receivers and one of said signals at a receiver of another one of said at least two arrays of receivers.

26. The apparatus of claim 1 wherein said electromagnetic field comprises currents induced in said earth formation and wherein said resulting signals are induced signals resulting from said induced currents, and wherein said processor is configured to determine said characteristic as a phase of an induced signal relative to a phase of a current in said at least one transmitter.

27. The apparatus of claim 1 wherein said borehole is a deviated borehole and wherein said processor further determines a relative dip angle from said measurements using a borehole diameter correction.

28. A method for investigating an earth formation, the method comprising:
(a) conveying a logging instrument into a borehole in said earth formation;
(b) using at least one transmitter on the instrument for producing an electromagnetic field in said earth formation
(c) using at least two arrays of receivers on the instrument for receiving signals resulting from said electromagnetic field, the at least two arrays of receivers displaced from the at least one transmitter along a longitudinal direction of the instrument; and
(d) determining from said signals a characteristic of said earth formation;
wherein at least one of (I) said at least one transmitter, and, (II) said at least two arrays of receivers, are positioned in proximity to a wall of the borehole.

29. The method of claim 28 further comprising conveying said instrument using a wireline.

30. The method of claim 28 wherein the positioning of at least one of (I) the at least one transmitter, and (II) the at least two arrays of receivers further comprises using an extension device coupling a body of the instrument to at least one pad on which the at least one of (I) the at least one transmitter, and (II) the at least two arrays of receivers are mounted.

31. The method of claim 30 further comprising moving said at least one pad using an extension device that is one of (i) electrically operated, (ii) electromechanically operated, (iii) mechanically operated, and, (iv) hydraulically operated.

32. The method of claim 30 wherein said at least pad comprises a plurality of pads disposed circumferentially around said body of said instrument.

33. The method of claim 30 further comprising positioning said at least two arrays of receivers on said at least one pad.

34. The method of claim 33 wherein said producing said electromagnetic field further comprise using at least one transmitter on said pad.

35. The method of claim 34 wherein using said at least one transmitter comprises using at least two transmitters positioned on said pad on opposite sides of said at least two arrays of receivers.

36. The method of claim 34 wherein said at least one transmitter comprises
a coil with an axis substantially orthogonal to a longitudinal axis of said instrument.

37. The method of claim 36 further comprising determining a longitudinal extent of said coil based on a desired resolution of an image of said wall.

38. The method of claim 34 further comprising setting a conductor of said at least one transmitter in a recess on said pad.

39. The method of claim 34 further comprising setting conductors for said at least two arrays of receivers in a recess on said pad.

40. The method of claim 33 further comprising positioning receivers of one of said at least two arrays of receivers circumferentially on said pad with respect to a longitudinal axis of said instrument.

41. The method of claim 40 further comprising position said receivers of said one of said at least two arrays in at least two rows spaced apart longitudinally and overlapping circumferentially.

42. The method of claim 40 further comprising positioning said receivers of said one of said at least two arrays are circumferentially in a non-overlapping manner.

43. The method of claim 30 further comprising selecting a frequency of said electromagnetic field based on at least one of (i) a sensitivity to a standoff of said pad from said wall, (ii) a desired resolution of an image of said wall.

44. The method of claim 28 wherein said at least one transmitter comprises
a coil with an axis substantially parallel to a longitudinal axis of said instrument.

45. The method of claim 44 further comprising determining a longitudinal extent of said coil based on a desired resolution of an image of said wall.

46. The method of claim 28 wherein determining said characteristic of said formation further comprises determining at least one of (i) an image of a wall of said borehole, (ii) a resistivity of said earth formation, (iii) a dielectric constant of said earth formation, (iv) a relative dip of of a boundary of said earth formation, and, (v) a relative strike of a boundary of said earth formation.

47. The method of claim 46 further comprising determining a longitudinal separation of one of said at least two arrays of receivers and another of said at least two arrays of receivers based on a desired resolution of said image.

48. The method of claim 28 wherein determining said characteristic further comprises using at least one of (i) an amplitude difference between one of said signals at a receiver of one of said at least two arrays of receivers and one of said signals at a receiver of another one of said at least two arrays of receivers, (ii) a phase difference between one of said signals at a receiver of one of said at least two arrays of receivers and one of said signals at a receiver of another one of said at least two ways of receivers.

49. The method of claim 28 wherein said borehole is a deviated borehole the method further comprising determining a relative dip angle from said measurements using a borehole diameter correction.

* * * * *